United States Patent
Yi et al.

(10) Patent No.: US 10,521,323 B2
(45) Date of Patent: Dec. 31, 2019

(54) TERMINAL CONTROLLING METHOD AND TERMINAL THEREFOR

(71) Applicant: Samsung Electronics Co. Ltd., Suwon-si, Gyeonggi-do (KR)

(72) Inventors: Sang-ho Yi, Seoul (KR); Yoon-kyung Lee, Seoul (KR); Jae-hyuck Shin, Suwon-si (KR); Hyun-jin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 14/025,071

(22) Filed: Sep. 12, 2013

(65) Prior Publication Data

US 2014/0075055 A1    Mar. 13, 2014

(30) Foreign Application Priority Data

Sep. 13, 2012  (KR) .................. 10-2012-0101797

(51) Int. Cl.
*G06F 15/04* (2006.01)
*G06F 11/30* (2006.01)
(Continued)

(52) U.S. Cl.
CPC .......... *G06F 11/3051* (2013.01); *G06F 1/325* (2013.01); *G06F 1/3206* (2013.01);
(Continued)

(58) Field of Classification Search
CPC ............ G06F 11/3058; G06F 11/3093; G06F 1/3206; G06F 1/325; H04W 24/00; H04W 4/025; G06N 99/005; H04Q 9/00
(Continued)

(56) References Cited

U.S. PATENT DOCUMENTS 7,145,454 B2  12/2006  Linjama et al.
7,187,277 B2   3/2007  Kobayashi
(Continued)

FOREIGN PATENT DOCUMENTS

CN   1829186 A   9/2006
CN   1930897 A   3/2007
(Continued)

OTHER PUBLICATIONS

Japanese publication 2010-110623, A, Publication date May 20, 2010, English translation of WO 2010/041443 A1), Detailed Description 11 pages (Year: 2010).*

(Continued)

*Primary Examiner* — Idriss N Alrobaye
*Assistant Examiner* — Brooke J Taylor
(74) *Attorney, Agent, or Firm* — Jefferson IP Law, LLP

(57) ABSTRACT

A method of controlling a terminal is provided. The method includes determining a current status of at least one of the terminal and a peripheral environment of the terminal based on information obtained by using at least one sensor from a predetermined list of a plurality of statuses regarding the terminal or the peripheral environment of the terminal, determining an operation schedule of the at least one sensor based on the determined current status and the information obtained by using the at least one sensor, and controlling the at least one sensor to operate based on the determined operation schedule.

20 Claims, 7 Drawing Sheets

(51) Int. Cl.
  *G06F 1/3206* (2019.01)
  *G06F 1/3234* (2019.01)
  *G01C 22/00* (2006.01)
  *H04Q 9/00* (2006.01)

(52) U.S. Cl.
  CPC ...... *G06F 11/3058* (2013.01); *G06F 11/3093* (2013.01); *A63B 2220/80* (2013.01); *G06F 11/3055* (2013.01); *H04Q 9/00* (2013.01); *H04Q 2209/883* (2013.01)

(58) Field of Classification Search
  USPC ............................................. 710/19
  See application file for complete search history.

(56) References Cited

U.S. PATENT DOCUMENTS

| | | | |
|---|---|---|---|
| 7,603,112 B2* | 10/2009 | Huomo et al. | 455/414.2 |
| 8,311,769 B2* | 11/2012 | Yuen | A61B 5/0002 702/160 |
| 9,086,875 B2 | 7/2015 | Harrat et al. | |
| 10,133,482 B2 | 11/2018 | Ferren | |
| 2002/0054174 A1* | 5/2002 | Abbott | G06F 1/163 715/863 |
| 2004/0239525 A1* | 12/2004 | Kobayashi | G08B 13/00 340/870.16 |
| 2005/0164633 A1 | 7/2005 | Linjama et al. | |
| 2006/0253598 A1* | 11/2006 | Nakamura et al. | 709/230 |
| 2008/0243440 A1 | 10/2008 | Matsumoto et al. | |
| 2010/0177037 A1 | 7/2010 | Kim et al. | |
| 2010/0306837 A1 | 12/2010 | Ueno et al. | |
| 2010/0315253 A1 | 12/2010 | Hong et al. | |
| 2011/0194471 A1* | 8/2011 | Kim et al. | 370/311 |
| 2011/0282620 A1 | 11/2011 | Sakuraoka | |
| 2011/0300875 A1 | 12/2011 | Kim et al. | |
| 2012/0004881 A1 | 1/2012 | Jung et al. | |
| 2012/0096288 A1 | 4/2012 | Bates et al. | |
| 2012/0100895 A1 | 4/2012 | Priyantha et al. | |
| 2012/0185717 A1 | 7/2012 | Song et al. | |
| 2012/0276932 A1* | 11/2012 | Ferren | G02B 13/0065 455/456.6 |
| 2013/0101264 A1* | 4/2013 | Vermeulen | H04M 1/72522 386/225 |
| 2013/0136363 A1 | 5/2013 | Na | |
| 2013/0238535 A1* | 9/2013 | Leppanen et al. | 706/12 |
| 2014/0187264 A1* | 7/2014 | Min et al. | 455/456.2 |
| 2014/0313151 A1 | 10/2014 | Kim et al. | |

FOREIGN PATENT DOCUMENTS

| | | | | |
|---|---|---|---|---|
| CN | 101448340 | A | 6/2009 | |
| EP | 2 395 412 | A1 | 12/2011 | |
| JP | 2004-355165 | A | 12/2004 | |
| KR | 10-2010-0021863 | A | 2/2010 | |
| KR | 10-0994151 | B1 | 11/2010 | |
| KR | 10-2012-0003936 | A | 1/2012 | |
| KR | 10-2012-0014233 | A | 2/2012 | |
| KR | 10-2012-0014480 | A | 2/2012 | |
| WO | WO-2010041443 | A1 * | 4/2010 | ........... A47K 13/305 |

OTHER PUBLICATIONS

Japanese publication 2010-110623, A, Publication date May 20, 2010, English translation of WO 2010/041443 A1), Drawings 9 pages (Year: 2010).*

Korean Office Action with English translation dated Sep. 18, 2018; Korean Appln. No. 10-2012-0101797.

Korean Notice of Allowance dated Mar. 29, 2019, issued in Korean Application No. 10-2012-0101797.

* cited by examiner

FIG. 4

| STATUS LIST | SENSORS | OPERATION FREQUENCY INCREASE CONDITION | PERIOD ADJUSTING FACTOR | MAXIMUM REQUIREMENT VALUE | MINIMUM REQUIREMENT VALUE | OPERATION FREQUENCY DECREASE CONDITION |
|---|---|---|---|---|---|---|
| WALKING | ACCELERATOR | T0 < SIZE OF DETECTED VALUE < T1 | Factor_A1 | Mx_A1 | Mn_A1 | |
| | BAROMETER | T2 < CHANGE < T3 | Factor_B1 | Mx_B1 | Mn_B1 | |
| | GYROSCOPE | T4 < SIZE OF DETECTED VALUE < T5 | Factor_G1 | Mx_G1 | Mn_G1 | |
| STANDING | ACCELERATOR | T6 < SIZE OF DETECTED VALUE < T7 | Factor_A2 | Mx_A2 | Mn_A2 | WHEN VALUE DETECTED BY A SENSOR DOES NOT CORRESPOND TO OPERATION FREQUENCY INCREASE CONDITION |
| | BAROMETER | CHANGE < T8 | Factor_B2 | Mx_B2 | Mn_B2 | |
| | GYROSCOPE | T9 < SIZE OF DETECTED VALUE < T10 | Factor_G2 | Mx_G2 | Mn_G2 | |
| SITTING | ACCELERATOR | SIZE OF DETECTED VALUE < T11 | Factor_A3 | Mx_A3 | Mn_A3 | |
| | BAROMETER | CHANGE < T12 | Factor_B3 | Mx_B3 | Mn_B3 | |
| | GYROSCOPE | SIZE OF DETECTED VALUE < T13 | Factor_G3 | Mx_G3 | Mn_G3 | |
| RUNNING | ACCELERATOR | T14 < SIZE OF DETECTED VALUE | Factor_A4 | Mx_A4 | Mn_A4 | |
| | BAROMETER | T15 < CHANGE < T16 | Factor_B4 | Mx_B4 | Mn_B4 | |
| | GYROSCOPE | T17 < SIZE OF DETECTED VALUE < T18 | Factor_G4 | Mx_G4 | Mn_G4 | |

FIG. 5

MSR_Ai = max(Mx_Ai, max(Mn_Aj for all j = 1 ~ n, where j != i))
OPERATION FREQUENCY DECREASE RATE = RECENT PERIOD ADJUSTING FACTOR

* MSR: MAXIMUM OPERATION FREQUENCY

ACCELERATOR:
- OPERATION FREQUENCY INCREASE (Factor_A3, MSR_A3) (SITTING) — 0 (Lowest), T11
- FREQUENCY INCREASE OPERATION — T6
- OPERATION FREQUENCY INCREASE (Factor_A2, MSR_A2) (STANDING) — T7
- FREQUENCY DECREASE OPERATION — T0
- OPERATION FREQUENCY INCREASE (Factor_A1, MSR_A1) (WALKING) — T1
- FREQUENCY DECREASE OPERATION — T14
- OPERATION FREQUENCY INCREASE (Factor_A4, MSR_A4) (RUNNING) — Max (Highest)
- SIZE OF DETECTED VALUE MSR_Bi = max(Mx_Bi, max(Mn_Bj for all j = 1 ~ n, where j != i))
For the overlapped conditions, use maximum value among them BAROMETER:
- OPERATION FREQUENCY INCREASE Factor_B3, MSR_B3 (SITTING)
- OPERATION FREQUENCY INCREASE (Factor_B2, MSR_B2)(STANDING) — T12
- FREQUENCY INCREASE OPERATION — T8
- OPERATION FREQUENCY INCREASE (Factor_B1, MSR_B1) (WALKING) — T2
- OPERATION FREQUENCY INCREASE (Factor_B4, MSR_B4) (RUNNING) — T15, T16 Max (Highest)
- CHANGE MSR_Gi = max(Mx_Gi, max(Mn_Gj for all j = 1 ~ n, where j != i))

GYROSCOPE:
- OPERATION FREQUENCY INCREASE (Factor_G3, MSR_G3) (SITTING) — 0 (Lowest), T13
- FREQUENCY INCREASE OPERATION — T9
- OPERATION FREQUENCY INCREASE (Factor_G2, MSR_G2) (STANDING) — T10
- FREQUENCY DECREASE OPERATION — T4
- OPERATION FREQUENCY INCREASE (Factor_G1, MSR_G1) (WALKING) — T15
- FREQUENCY DECREASE OPERATION — T17
- OPERATION FREQUENCY INCREASE (Factor_G4, MSR_G4) (RUNNING) — T18 Max (Highest)
- SIZE OF DETECTED VALUE

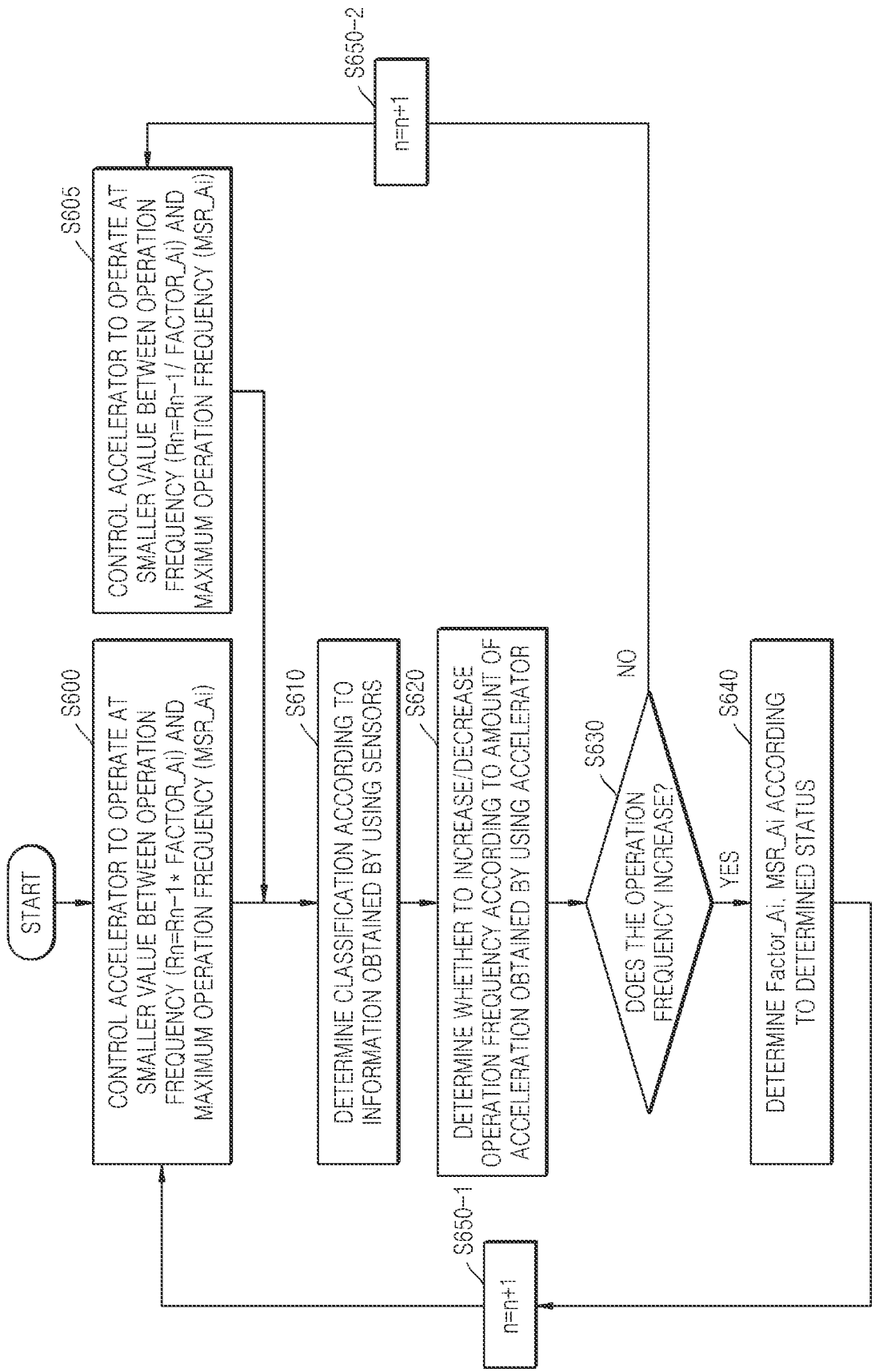

TERMINAL CONTROLLING METHOD AND TERMINAL THEREFOR

CROSS-REFERENCE TO RELATED PATENT APPLICATION(S)

This application claims the benefit under 35 U.S.C. § 119(a) of a Korean patent application filed on Sep. 13, 2012 in the Korean Intellectual Property Office and assigned Serial No. 10-2012-0101797, the entire disclosure of which is hereby incorporated by reference.

TECHNICAL FIELD

The present disclosure relates to a terminal controlling method and a terminal therefor. More particularly, the present disclosure relates to a terminal controlling method to control a sensor according to a status of a terminal or a peripheral environment of the terminal and the terminal therefor.

BACKGROUND

With advances in technology, terminals such as portable phones, tablet Personal Computers (PCs), and the like have been developed to include various sensors for detecting statuses of the terminals or peripheral environments of the terminals. According to the related art, the terminals obtain various pieces of information and use the obtained information in various ways, by using various sensors included in the terminals.

The terminals including various sensors periodically obtain information by periodically operating the sensors. However, such periodic operations of the sensors are problematic because of the associated power consumption. Accordingly, unnecessarily frequent operations of such operations result in waste of power and resources.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal controlling method to operate a sensor included in a terminal according to an appropriate operation schedule based on a status of the terminal or a peripheral environment of the terminal.

In accordance with an aspect of the present disclosure, a method of controlling a terminal including at least one sensor is provided. The method includes determining a current status of at least one of the terminal and a peripheral environment of the terminal based on information obtained by using the at least one sensor from a predetermined list of a plurality of statuses regarding the terminal or the peripheral environment of the terminal, determining an operation schedule of the at least one sensor based on the determined current status and the information obtained by using the at least one sensor, and controlling the at least one sensor to operate based on the determined operation schedule.

In accordance with an aspect of the present disclosure, the determining of the operation schedule may include determining an operation frequency of the at least one sensor based on the determined current status and the information obtained by using the at least one sensor.

In accordance with an aspect of the present disclosure, the determining of the operation frequency may include obtaining a period adjusting factor regarding at least one of an increase and a decrease in the operation frequency of the at least one sensor and a maximum operation frequency based on the determined current status, and determining the operation frequency of the at least one sensor based on a current operation frequency by which the at least one sensor currently operates, the period adjusting factor, and the maximum operation frequency.

In accordance with an aspect of the present disclosure, the determining of the operation frequency may include determining a smaller value between a value obtained by multiplying a current operation frequency and the period adjusting factor, and the maximum operation frequency as the operation frequency of the at least one sensor.

In accordance with an aspect of the present disclosure, the determining of the operation frequency may include determining whether to increase or decrease the operation frequency of the at least one sensor according to whether a value detected by the at least one value is included in a previously set range, and determining the previously set range based on the determined current status.

In accordance with an aspect of the present disclosure, the maximum operation frequency may be a greater value between a maximum requirement value corresponding to the determined current status and a minimum requirement value corresponding to the statuses included in the list of the plurality of statuses other than the determined current status.

In accordance with an aspect of the present disclosure, the method may further include selecting a sensor for which an operation schedule is to be changed based on the determined current status from the at least one sensor, wherein the determining of the operation schedule includes changing the operation schedule of the selected sensor.

In accordance with an aspect of the present disclosure, the determining of the operation schedule may include disabling or decreasing an operation frequency of the at least one sensor other than the selected sensor.

In accordance with an aspect of the present disclosure, the determining of the current status may include determining the current status of the at least one of the terminal and the peripheral environment of the terminal based on an application executed by the terminal or on information regarding a job performed through the application.

In accordance with an aspect of the present disclosure, the method may further include setting an operation mode of the terminal, wherein the determining of the operation schedule includes when the operation mode of the terminal is set as a saving mode, selecting one of the at least one sensor obtaining a value equal to or greater than a predetermined value, and determining to increase or enable the operation frequency of the selected sensor.

In accordance with an aspect of the present disclosure, the determining of the operation schedule may include when a plurality of statuses are determined based on the information obtained by using the at least one sensor, determining a plurality of operation schedules based on the plurality of statuses, and removing a redundant operation from operations of the at least one sensor included in the determined plurality of operation schedules.

In accordance with another aspect of the present disclosure, a non-transitory computer-readable storage medium is provided. The non-transitory computer-readable storage medium may store instructions that, when executed, cause at least one processor to determine a current status of at least one of the terminal and a peripheral environment of the terminal based on information obtained by using the at least one sensor from a predetermined list of a plurality of statuses regarding the terminal or the peripheral environment of the terminal, determine an operation schedule of the at least one sensor based on the determined current status and the information obtained by using the at least one sensor, and control the at least one sensor to operate based on the determined operation schedule.

In accordance with another aspect of the present disclosure, a terminal is provided. The terminal includes at least one sensor, a status determiner configured to determine a current status of at least one of the terminal or a peripheral environment of the terminal based on information obtained by using the at least one sensor from a predetermined list of a plurality of statuses regarding the terminal or the peripheral environment of the terminal, a scheduler configured to determine an operation schedule of the at least one sensor based on the determined current status and the information obtained by using the at least one sensor, and a controller configured to control the at least one sensor to operate based on the determined operation schedule.

In accordance with an aspect of the present disclosure, the scheduler may determine an operation frequency of the at least one sensor based on the determined current status and the information obtained by using the at least one sensor.

In accordance with an aspect of the present disclosure, the scheduler may obtain a period adjusting factor regarding at least one of an increase and a decrease in the operation frequency of the at least one sensor and a maximum operation frequency based on the determined current status, and determine the operation frequency of the at least one sensor based on a current operation frequency by which the at least one sensor currently operates, the period adjusting factor, and the maximum operation frequency.

In accordance with an aspect of the present disclosure, the scheduler may determine a smaller value between a value obtained by multiplying a current operation frequency and the period adjusting factor, and the maximum operation frequency as the operation frequency of the at least one sensor.

In accordance with an aspect of the present disclosure, the scheduler may determine whether to increase or decrease the operation frequency of the at least one sensor according to whether a value detected by the at least one value is included in a previously set range, and determine the previously set range based on the determined current status.

In accordance with an aspect of the present disclosure, the maximum operation frequency may be a greater value between a maximum requirement value corresponding to the determined current status and a minimum requirement value corresponding to the statuses included in the list of the plurality of statuses other than the determined current status.

In accordance with an aspect of the present disclosure, the scheduler may select a sensor for which an operation schedule is to be changed based on the determined current status from the at least one sensor, and change the operation schedule of the selected sensor.

In accordance with an aspect of the present disclosure, the scheduler may disable or decrease an operation frequency of the at least one sensor other than the selected sensor.

In accordance with an aspect of the present disclosure, the status determiner may determine the current status of the at least one of the terminal and the peripheral environment of the terminal based on an application executed by the terminal or information regarding a job performed through the application.

In accordance with an aspect of the present disclosure, the controller may set an operation mode of the terminal, and wherein, when the operation mode of the terminal is set as a saving mode, the scheduler selects one of the at least one sensor obtaining a value equal to or greater than a predetermined value, and determines to increase or enable the operation frequency of the selected sensor.

In accordance with an aspect of the present disclosure, when a plurality of statuses are determined based on the information obtained by using the at least one sensor, the scheduler may determine a plurality of operation schedules based on the plurality of statuses, and remove a redundant operation from operations of the at least one sensor included in the determined plurality of operation schedules.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a table of requirements for each sensor with respect to statuses determined by a status determiner according to an embodiment of the present disclosure;

FIG. 5 is a view of a reference used to determine whether to increase or decrease an operation frequency of each sensor and a maximum operation frequency of operating each sensor according to an embodiment of the present disclosure;

FIG. 6 is a flowchart illustrating a method of increasing or decreasing an operation frequency of an accelerator according to an embodiment of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected" to another element, it may be directly connected to the other element or may be indirectly connected to the other element with other element(s) interposed there between. It will also be understood that the terms "comprises", "includes", and "has", when used herein, specify the presence of stated elements, but do not preclude the presence or addition of other elements, unless otherwise defined.

As a non-exhaustive illustration only, a terminal described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and the like capable of wireless communication or network communication consistent with that disclosed herein.

Hereinafter, various embodiments of the present disclosure will be described in detail with reference to the accompanying drawings.

Figure 1:
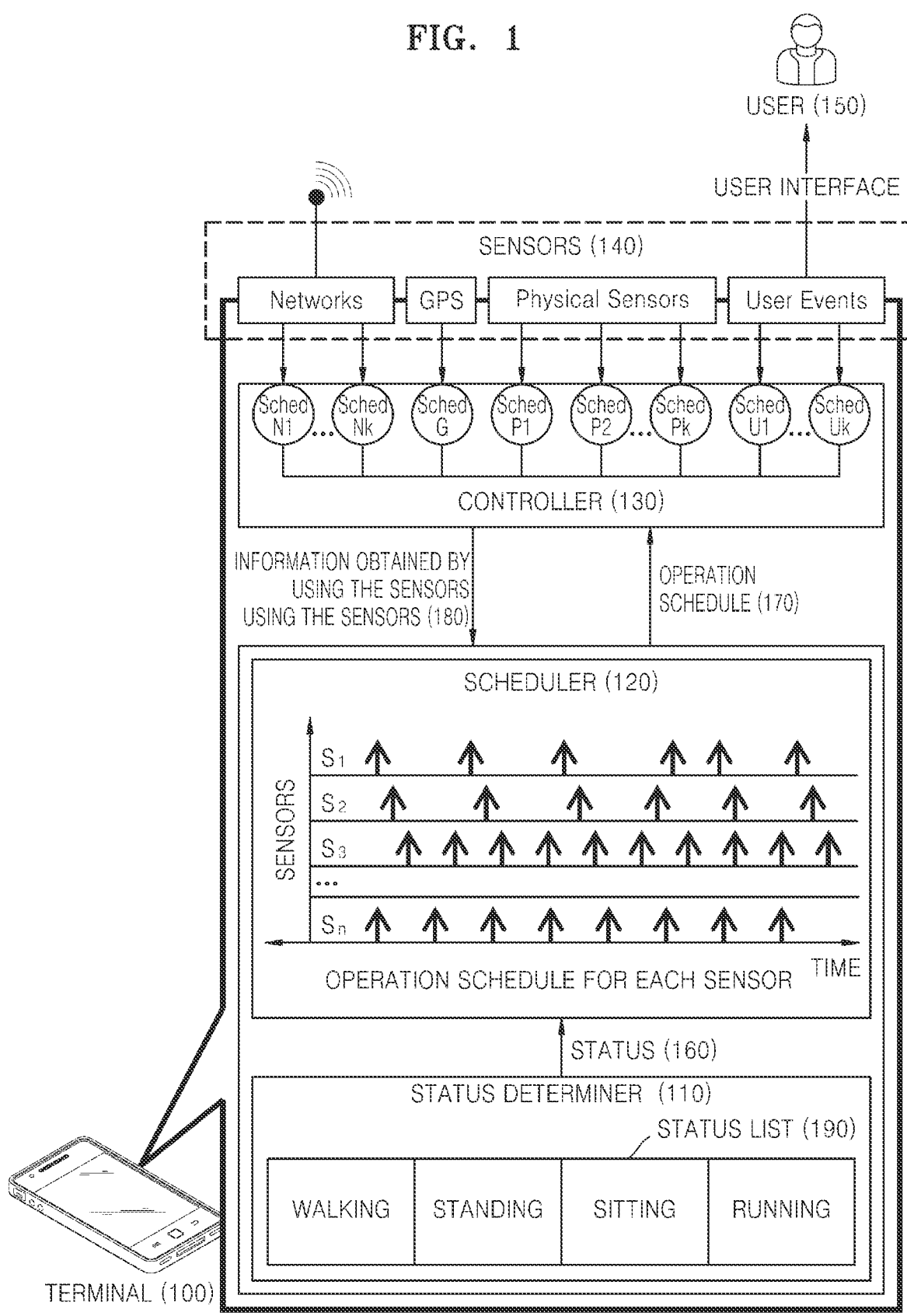
FIG. 1 is a view of a construction of a terminal according to an embodiment of the present disclosure.

FIG. 1 is a view of a construction of a terminal 100 according to an embodiment of the present disclosure.

Referring to FIG. 1, the terminal 100 may detect a status 160 of the terminal 100 or a peripheral environment of the terminal 100 by using at least one of various sensors 140.

According to various embodiments of the present disclosure, the terminal 100 may include a status determiner 110, a scheduler 120, a sensor 140, and a status list 190. According to various embodiments of the present disclosure, the terminal 100 may also include a controller 130.

The sensor 140 may be configured as a physical sensor such as an accelerometer, a barometer, a gyroscope, and/or the like. The sensor 140 may also be configured as a chemical sensor such as a gas sensor, a humidity sensor, a bio sensor, and/or the like. The sensor 140 may also be configured as a sensor for determining a location of the terminal 100 such as a Global Positioning System (GPS), and/or the like. The sensor 140 may detect an event that occurs through a user interface. The sensor 140 may detect information that is transmitted or received over a network.

The accelerometer is a device that measures a reaction due to inertia to measure a rectilinear acceleration or an angular acceleration. When a measured angular frequency is lower than an inherent angular frequency of a mass portion, because a displacement of the mass portion almost corresponds to acceleration, the accelerometer may measure the acceleration by using such a principle. Examples of an accelerometer that measures the acceleration according to such a principle include a moving coil accelerometer, a piezoelectric accelerometer, a capacitive accelerometer, a strain gauge type accelerometer, a servo type accelerometer, a differential transformer type accelerometer, and the like.

The moving coil accelerometer measures an Electromotive Force (EMF) generated according to a change in relative locations of magnet and coils that are mounted in a pendulum. The piezoelectric accelerometer, the capacitive accelerometer, the strain gauge type accelerometer, and the differential transformer type accelerometer detect the displacement of the mass portion by using a piezoelectric device, capacitance, a strain gauge, and a differential transformer, respectively. The servo type accelerometer calculates acceleration from a current that flows through driving coils by making the displacement of the mass portion zero by using a servo instrument. A silicon semiconductor accelerometer has recently been developed using a fine-processing technology. In addition, acceleration may be measured by using various principles such as by forming a plurality of beams having different lengths on a single silicon chip and analyzing frequencies.

The barometer is a device that measures an atmospheric pressure. Examples of the barometer include a mercury barometer, an aneroid barometer, a barograph, and the like. The mercury barometer measures the atmospheric pressure according to a height of a mercury column generated when a pipe with one closed end is filled with mercury and is stood vertically. The aneroid barometer measures atmospheric pressure without the use of fluids. The aneroid barometer includes a partially evacuated metal chamber having a thin corrugated lid which is displaced by variations in the external air pressure.

The gyroscope is a sensor that detects an angular speed. A basic principle of the gyroscope is to measure the angular speed by measuring a force generated in a direction in which an angular momentum vector is preserved according to an angular momentum of a rotation body that rotates at high speed.

The gas sensor is a generic term for sensors that detect a gas according to a type or concentration of the gas. The gas sensor may detect the type or concentration of the gas by using an electrochemical method, an optical method, an electric method, and/or the like.

The humidity sensor is a sensor that detects humidity by using various phenomena relating to humidity in the air. Examples of the humidity sensor include a psychrometer, a hair hydrometer, a lithium chloride humidity sensor, an electrolytic humidity sensor, a polymer membrane humidity sensor, a modified oscillating humidity sensor, an aluminum oxide humidity sensor, a ceramic humidity sensor, a thermistor humidity sensor, a microwave humidity sensor, a condensation sensor, a dew point sensor, an integrated circuit humidity sensor, and the like.

The bio sensor is a device that irradiates a property of a material by using a function of an organism. For example, the bio sensor may measure whether the material exists by using a good selective reaction of a biocatalyst such as an enzyme, a microorganism, or cells of animals and plants, and a specific material. A representative mechanism of the bio sensor allows the enzyme to be fixed in a membrane shape, attaches an electrode to the fixed membrane, and allows a computer to read an action.

The GPS is a system that provides a location of a device by using satellites. A GPS receiver may calculate a current location by measuring time and a distance from three or more satellites and using a triangulation method of obtaining three different distances.

According to various embodiments of the present disclosure, the sensor 140 that detects the event that occurs through the user interface may be implemented via a processor. For example, the sensor 140 may detect an application executed by a user 150, a use frequency of the application, a Uniform Resource Locator (URL) of a web page which the user accesses, a search keyword, reproduced content, and/or the like.

According to various embodiments of the present disclosure, the sensor 140 may detect the information that is transmitted or received over the network. For example, the sensor 140 may detect text sent by the user 150 through a Social Networking Service (SNS), location information received from another terminal, product purchase information, text received from another terminal, and/or the like.

The terminal 100 may control the sensor 140 to periodically operate so as to obtain information by using the sensor 140.

According to various embodiments of the present disclosure, the terminal 100 may determine the status 160 of the terminal 100 or the peripheral environment of the terminal 100 by using the sensor 140. In this regard, the status 160 of the terminal 100 or the peripheral environment of the terminal 100 may be determined by a status determiner 110 based on information 180 obtained by using the sensor 140. For example, a status list 190 including the status 160 of the terminal 100 or the peripheral environment of the terminal 100 such as a walking status of the user 150, a standing status of the user 150, a sitting status of the user 150, and a running status of the user 150 may be previously set. In this regard, the status determiner 110 may determine one of statuses included in the status list 190 as the status 160 of the terminal 100 or the peripheral environment of the terminal 100 according to information obtained by using the accelerometer, the barometer, the gyroscope, and/or the like included in the sensor 140.

The status list 190 including a plurality of statuses may be previously set in the terminal 100. In this regard, a status is a classification of the information obtained by using the sensor 140 for setting an operation schedule 170 of the sensor 140 according to circumstances of the terminal 100 and the user 150.

According to various embodiments of the present disclosure, requirements for the operation schedule 170 of the sensor 140 according to each status included in the status list 190 may be previously set. For example, a type of the sensor 140 for detecting the walking status of the user 150 of the terminal 100, a maximum latency, a minimum operation frequency, a maximum operation frequency, and/or the like may be previously set.

According to various embodiments of the present disclosure, a scheduler 120 may determine the operation schedule 170 of the sensor 140 based on the status determined by the status determiner 110 and the information 180 obtained by using the sensor 140. In this regard, the operation schedule 170 of the sensor 140 determined by the scheduler 120 may be used to control the sensor 140 to operate by consuming less power and resources within a range satisfying the requirements for the operation schedule 170 of the sensor 140 that needs to operate.

Figure 2:
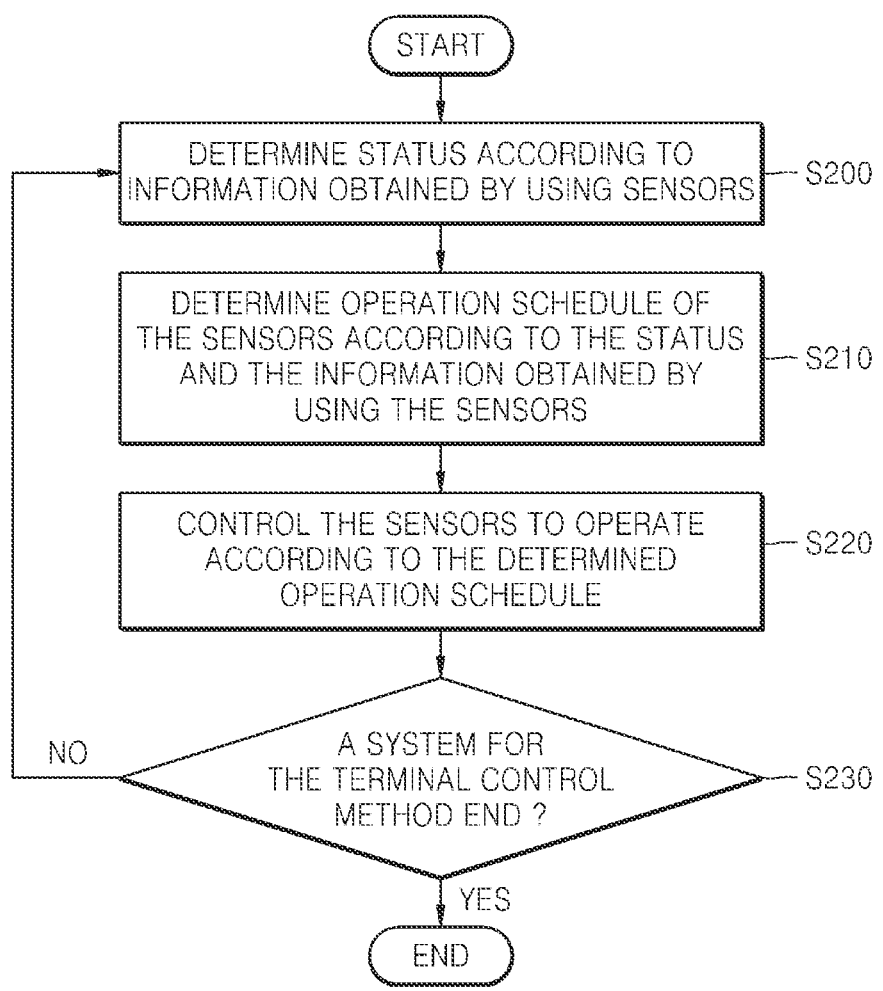
FIG. 2 is a flowchart illustrating a terminal control method according to an embodiment of the present disclosure.

FIG. 2 is a flowchart illustrating a terminal control method according to an embodiment of the present disclosure.

Referring to FIG. 2, at operation S200, the status determiner 110 may determine the status 160 of the terminal 100 or the peripheral environment of the terminal 100 based on the information 180 obtained by using the sensors 140. In this regard, the status list 190 including the status 160 of the terminal 100 or the peripheral environment of the terminal 100 may be previously set. For example, the status list 190 including a walking status of the user 150, a standing status of the user 150, a sitting status of the user 150, and a running status of the user 150 may be previously set.

For example, the terminal 100 may obtain motion information by using an accelerometer and a gyroscope included in the sensors 140. When information corresponding to the obtained motion information is motion information regarding the walking status of the user 150 included in the status list 190, the status determiner 110 may determine the current status 160 of the terminal 100 or the peripheral environment of the terminal 100 as the walking status.

The information 180 obtained by using the sensors 140 is information obtained by operating the sensors 140. For example, when the sensors 140 include the accelerometer, the information 180 obtained by using the sensors 140 may include information regarding an acceleration obtained by using the accelerometer. As another example, when the sensors 140 detect an application executed by the user 150 through a user interface, the information 180 obtained by using the sensors 140 may include information regarding a list of applications executed by the terminal 100 and application execution times.

According to an embodiment of the present disclosure, the status determiner 110 may determine the current status 160 of the terminal 100 or the peripheral environment of the terminal 100 based on information regarding applications executed by the terminal 100 or jobs performed by executing the applications. For example, when the user 150 executes a moving image reproduction related application or a moving image, the status determiner 110 may determine the current status 160 of the terminal 100 or the peripheral environment of the terminal 100 as a moving image watching status of the user 150 of the terminal 100.

Thereafter, at operation S210, the scheduler 120 may determine the operation schedule 170 of the sensors 140 based on the determined status 160 and the information 180 obtained by using the sensors 140.

In this regard, the operation schedules 170 are reference information used to operate the sensors 140. The operation schedule 170 may include, for example, types of the sensors 140 that are to be enabled by a controller 130, operation frequencies of the sensors 140, types of information that are to be obtained by using the sensors 140, or power use levels of the sensors 140.

In this regard, according to various embodiments of the present disclosure, the scheduler 120 may determine the operation frequencies of the sensors 140 based on the status 160 determined by the status determiner 110 and the information 180 obtained by using the sensors 140. The scheduler 120 may determine a period adjusting factor and a maximum operation frequency according to the determined status 160. For example, the period adjusting factor and the maximum operation frequency may be included in requirements defined for each status included in the status list 190. A process of determining the operation frequencies of the sensors 140 according to the period adjusting factor and the maximum operation frequency will be described in detail with reference to FIGS. 5 and 6 which show examples of determining an operation frequency of the accelerator. According to various embodiments of the present disclosure, the period adjusting factor is a factor for adjusting the operation frequencies of the sensors 140 when the scheduler 120 determines the operation schedule 170. An operation frequency is a number of operations of the sensors 140 during a predetermined period of time. The maximum operation frequency is a limiting value used to restrict the sensors 140 to not operate more than a predetermined operation frequency.

According to various embodiments of the present disclosure, the scheduler 120 may select a sensor for changing the operation schedule 170 according to the determined status 160. For example, the scheduler 120 may increase an operation frequency of the accelerometer, a barometer, and the gyroscope according to the status 160 determined by the status determiner 110 and may gradually reduce or disable the operation frequencies of the sensors 140.

According to various embodiments of the present disclosure, the terminal 100 may set an operation mode of the terminal 100. When the terminal 100 sets the operation mode as a saving mode, the scheduler 120 may increase or enable an operation frequency of one of the sensors 140 when a value obtained by using the one of the sensors 140 is equal to or greater than a predetermined value. For example, when acceleration of an accelerator included in the terminal 100 for which the operation mode is set as the saving mode is equal to or greater than the predetermined value, the scheduler 120 may increase an operation frequency of the accelerator.

The status determiner 110 may determine a plurality of statuses 160. In this case, the scheduler 120 may determine the operation schedule 180 according to each of the plurality of statuses 160. Thereafter, the scheduler 120 may remove a redundant operation from among operations of the sensors 140 included in a plurality of operation schedules 170.

Thereafter, at operation S220, the controller 130 controls the sensors 140 to operate according to the operation schedule 170 determined by the scheduler 120.

At operation S230, the controller 130 determines whether a system for the terminal control method ends.

If the controller 130 determines that a system for the terminal control method does not end at operation S230, then the controller 130 may proceed to operation S200 at which the controller 130 may again provide the scheduler 120 or the status determiner 110 with information obtained by the sensors 140 that operate according to the operation schedule 170 determined by the scheduler 120.

In contrast, if the controller 130 determines that the system for the terminal control method ends, then the controller 130 may end the terminal control method.

Figure 3:
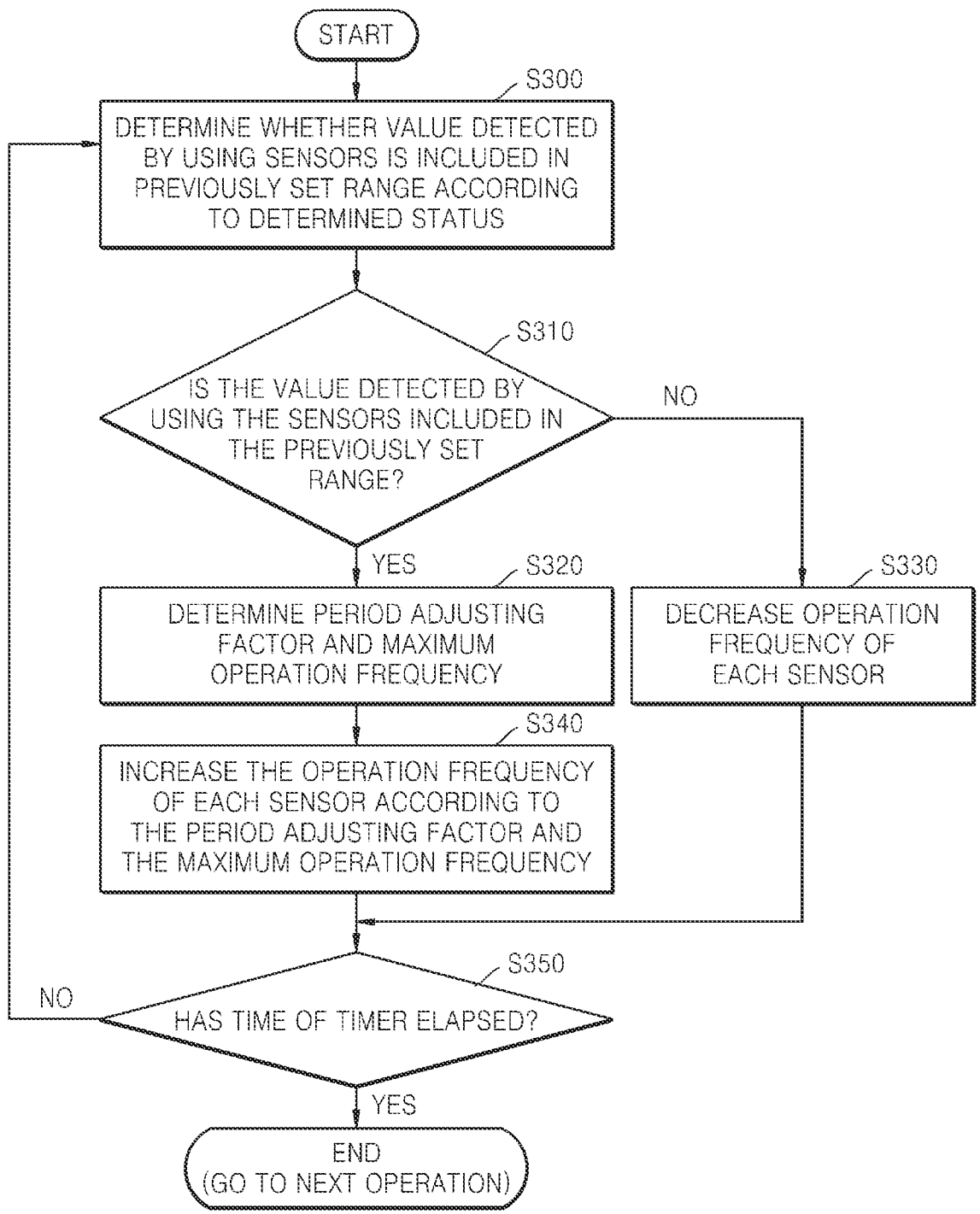
FIG. 3 is a detailed flowchart illustrating an operation of determining an operation schedule of a sensor according to an embodiment of the present disclosure.

FIG. 3 is a detailed flowchart illustrating an operation of determining an operation schedule of a sensor according to an embodiment of the present disclosure.

Referring to FIG. 3, the scheduler 120 may obtain the information 180 obtained by using the sensors 140. At operation S300, the scheduler 120 may determine whether a value included in the information 180 obtained by using the sensors 140 is included in a previously set range according to a status determined by the status determiner 110. For example, when a previously set range with respect to an accelerator according to the status determined by the status determiner 110 is equal to or greater than 1 and equal to or smaller than 10, the scheduler 120 may determine whether an amount of acceleration detected by the accelerator is equal to or greater than 1 and equal to or smaller than 10.

At operation S310, the scheduler 120 determines whether the value detected by the sensors 140 is included in the previously set range.

Thereafter, if the scheduler 120 determines whether the value detected by the sensors 140 is included in the previously set range at operation S310, then the scheduler 120 may proceed to operation S320 at which the scheduler 120 may determine a period adjusting factor and a maximum operation frequency according to the determined status.

Thereafter, at operation S340, the scheduler 120 may increase operation frequencies of the sensors 140 according to the period adjusting factor and the maximum operation frequency. In this regard, the period adjusting factor and the maximum operation frequency may be determined for each of the sensors 140 included in the terminal 100.

In contrast, if the scheduler 120 determines that the value detected by the sensors 140 is not included in the previously set range at operation S310, then the scheduler 120 may proceed to operation S330 at which the scheduler 120 may reduce the operation frequencies of the sensors 140. In this regard, the scheduler 120 may reduce the operation frequencies of the sensors 140 according to a period adjusting factor recently used to increase the operation frequencies of the sensors 140.

Thereafter, at operation S350, the scheduler 120 may determine whether a previously set time with respect to a timer included in the scheduler 120 has elapsed.

If the schedule 120 determines that the previously set time with respect to the timer included in the scheduler 120 has not elapsed at operation S350, then the scheduler 120 may repeat operations S300 through S340.

In contrast, if the scheduler 120 determines that the previously set time with respect to the timer included in the scheduler 120 has elapsed at operation S350, then the scheduler 120 may proceed to the next operation. For example, if the scheduler 120 determines that the previously set time with respect to the timer included in the scheduler 120 has elapsed at operation S350, then operation S220 in which the controller 130 controls the sensors 140 to operate according to the operation schedule 170 determined by the scheduler 120 is performed in such a way that the operation schedule 170 may be updated for the previously set time. In this regard, the timer may be initialized simultaneously with the performing of operation S220. The timer may be initialized at a time when information is firstly obtained by using the sensors 140 and at different times according to an implementation method.

FIG. 4 is a table of requirements for each of sensor with respect to statuses determined by a status determiner according to an embodiment of the present disclosure.

Referring to FIG. 4, according to various embodiments of the present disclosure, the status determiner 110 may determine one of a status list including a walking status, a standing status, a sitting status, and a running status. Types of the sensors 140 that change an operation frequency with respect to each status included in the status list, an operation frequency increase condition, a period adjusting factor, a maximum requirement value, a minimum requirement value, an operation frequency decrease condition, and/or the like may be previously set in the terminal 100.

In this regard, the types of the sensors 140 that change the operation frequency with respect to each status included in the status list may be determined according to the sensors 140 related to the statuses. For example, an accelerometer, a barometer, and a gyroscope that are the sensors 140 related to the walking status, the standing status, the sitting status, and the running status may be included in the types of the sensors 140.

The operation frequency increase condition is a reference used to determine whether to increase an operation frequency of each of the sensors 140 according to information obtained by using the sensors 140. For example, when a status determined by the status determiner 110 is the "walking status", and a change in an atmospheric pressure detected by the barometer is greater than T2 and smaller than T3, the scheduler 120 may increase an operation frequency of the barometer.

The period adjusting factor is a value indicating an increase or a decrease in the operation frequency of each of the sensors 140.

The maximum requirement value and the minimum requirement value are a maximum value and a minimum value, respectively, of the operation frequency of each of the sensors 140 to detect each status included in the status list.

When the information obtained by using the sensors 140 does not correspond to the operation frequency increase condition, the scheduler 120 may be set to decrease the operation frequency of each of the sensors 140.

FIG. 5 is a view of a reference used to determine whether to increase or decrease an operation frequency of each of sensor and a maximum operation frequency of operating each sensor according to an embodiment of the present disclosure.

Referring to FIG. 5, the scheduler 120 may determine the maximum operation frequency MSR_Ai and a period adjusting factor Factor_Ai according to a status determined by the status determiner 110. The maximum operation frequency MSR_Ai may be determined according to Equation 1 below.

$$MSR\_Ai = \max(Mx\_Ai, \max(Mn\_Aj \text{ for all } j=1 \sim n, \text{ where } j!=i)) \quad \text{Equation (1)}$$

For example, when the status determined by the status determiner 110 is a "standing status", among a maximum requirement value Mx_A2 of a barometer corresponding to the "standing status", a minimum requirement value Mn_A1 of the barometer corresponding to a "walking status", a minimum requirement value Mn_A3 of the barometer corresponding to a "sitting status", and a minimum requirement value Mn_A4 of the barometer corresponding to a "running status", a maximum value may be determined as the maximum operation frequency MSR_A2 corresponding to the "standing status".

The scheduler 120 may determine whether to increase the operation frequency of each of the sensors 140 according to information obtained by using the sensors 140. For example, when the status determined by the status determiner 110 is the "standing status", and an amount of acceleration detected by an accelerator is within a range equal to or greater than T6 and equal to or smaller than T7, the scheduler 120 may determine to increase an operation frequency of the accelerator.

When the status determined by the status determiner 110 is the "standing status", and the amount of acceleration detected by the accelerator is not within the range equal to or greater than T6 and equal to or smaller than T7, the scheduler 120 may determine to decrease the operation frequency of the accelerator. In this regard, a rate used to decrease the operation frequency may follow a recently applied period adjusting factor.

The maximum operation frequency and whether to increase or decrease the operation frequency may be determined with respect to the sensors 140 including a barometer and a gyroscope in the same manner as performed with respect to the accelerator.

FIG. 6 is a flowchart illustrating a method of increasing or decreasing an operation frequency of an accelerator according to an embodiment of the present disclosure.

Referring to FIG. 6, at operation S600, the scheduler 120 may determine to operate the accelerator at a smaller value between a value obtained by multiplying an operation frequency $R_{n-1}$ by which the accelerator currently operates and the period adjusting factor Factor_Ai determined in a previous operation and the maximum operation frequency MSR_Ai, and the controller 130 may control the accelerator to operate according to an operation frequency determined by the scheduler 120. In this regard, n denotes an operation identification value and may be an integer number.

According to various embodiments of the present disclosure, the period adjusting factor Factor_Ai may have a value equal to or greater than 1.

Thereafter, at operation S610, the status determiner 110 may determine a status corresponding to information obtained by using the sensors 140 from a status list. For example, the information obtained by using the sensors 140 may include an amount of acceleration obtained by using the accelerator.

Thereafter, at operation S620, the scheduler 120 may determine whether to increase or decrease the operation frequency of the accelerator according to the status determined by the status determiner 110 and the amount of acceleration obtained by using the accelerator. The operation of determining whether to increase the operation frequency of the accelerator may be performed as described with reference to FIGS. 4 and 5.

At operation S630, the scheduler 120 determines whether to increase the operation frequency of the accelerator.

If the scheduler 120 determines to increase the operation frequency of the accelerator at operation S630, then the scheduler 120 may proceed to operation S640 at which the scheduler 120 may determine the period adjusting factor Factor_Ai and the maximum operation frequency MSR_Ai according to the status determined by the status determiner 110.

Thereafter, at operation S650-1, the scheduler 120 may increase a value of n to proceed with a next operation.

Thereafter, the scheduler 120 may proceed to operation S600 at which the scheduler 120 may determine the operation frequency $R_n$ to operate the accelerator at the smaller value between the value obtained by multiplying the operation frequency $R_{n-1}$ by which the accelerator currently operates and the period adjusting factor Factor_Ai determined in the previous operation and the maximum operation frequency MSR_Ai, and the controller 130 may control the accelerator to operate according to the operation frequency $R_n$ determined by the scheduler 120.

In contrast, if the scheduler 120 determines not to increase the operation frequency of the accelerator at operation S630, then the scheduler 120 proceeds to operation S650-2 at which the scheduler 120 may increase the value of n to proceed with a next operation.

Thereafter, the scheduler 120 may proceed to operation S605 at which the scheduler 120 may determine the operation frequency $R_n$ to operate the accelerator at a smaller value between a value obtained by dividing the operation frequency $R_{n-1}$ by which the accelerator currently operates by the recently determined period adjusting factor Factor_Ai and the maximum operation frequency MSR_Ai, and the controller 130 may control the accelerator to operate according to the operation frequency $R_n$ determined by the scheduler 120.

FIGS. 4, 5, and 6 are merely to explain the various embodiments of the present disclosure and the present disclosure is not limited thereto.

Figure 7:
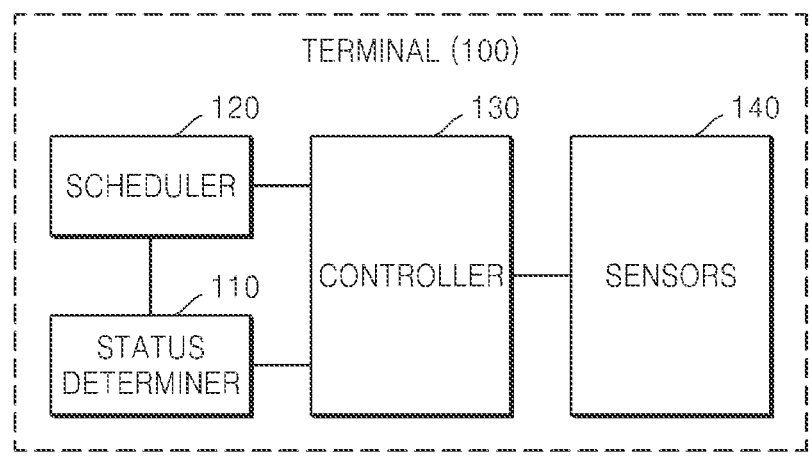
FIG. 7 is a schematic block diagram of a structure of a terminal according to an embodiment of the present disclosure.

FIG. 7 is a schematic block diagram of a structure of a terminal according to an embodiment of the present disclosure.

Referring to FIG. 7, according to various embodiments of the present disclosure, the terminal 100 includes the status determiner 110 that determines a status of the terminal 100 or a peripheral environment of the terminal 100, the scheduler 120 that determines an operation schedule of the sensors 140, the one or more sensors 140, and the controller 130 that controls the sensors 140 to operate according to the operation schedule of the sensors 140 determined by the scheduler 120.

The status determiner 110 may determine a current status of the terminal 100 or the peripheral environment of the terminal 100 based on information obtained by using the sensors 140. The status determiner 110 may select a value obtained by using the sensors 140 like an acceleration value obtained by using an accelerator or a status corresponding to a pattern of the obtained value from a status list.

According to various embodiments of the present disclosure, the status determiner 110 may determine the current status of the terminal 100 or the peripheral environment of the terminal 100 based on an application executed by the terminal 100 or information regarding a job performed through the application. For example, when the terminal 100 executes a navigation application, the status determiner 110 may determine the current status of the terminal 100 or the peripheral environment of the terminal 100 as a driving status of the user 150. As another example, the status determiner 110 may determine the current status of the terminal 100 or the peripheral environment of the terminal 100 based on text transmitted through an SNS application executed by the terminal 100.

The status determiner 110 may determine the current status of the terminal 100 or the peripheral environment of the terminal 100 in various ways according to various embodiments of the present disclosure.

The scheduler 120 may determine the operation schedule of the sensors 140 based on the determined status and the information obtained by using the sensors 140. In this regard, the operation schedule of the sensors 140 is a reference used to operate the sensors 140. The operation schedule of the sensors 140 may include various factors used by the controller 130 to control operations of the sensors 140 such as whether to disable the sensors 140, an operation frequency or a required accuracy of each of the sensors 140, and/or the like.

According to various embodiments of the present disclosure, the scheduler 120 may obtain a period adjusting factor that adjusts a degree of an increase and a decrease in the operation frequency of each of the sensors 140 and a maximum operation frequency thereof according to the status determined by the status determiner 110. When the scheduler 120 increases the operation frequency of each of the sensors 140, the scheduler 120 may determine a smaller value between a value obtained by multiplying a current operation frequency by which the sensors 140 currently operate and the obtained period adjusting factor and the maximum operation frequency as the operation frequency of each of the sensors 140. In this regard, the period adjusting factor may have a value equal to or greater than 1.

The scheduler 120 may determine whether to increase the operation frequency of each of the sensors 140 based on the status determined by the status determiner 110 and the value detected by each of the sensors 140. When the value detected by each of the sensors 140 is included in a previously set range, the scheduler 120 may determine to increase the operation frequency of each of the sensors 140. In this regard, the previously set range may be determined according to the status determined by the status determiner 110.

The scheduler 120 may determine a greater value between a maximum requirement value corresponding to the status determined by the status determiner 110 and a minimum requirement value for sensing corresponding to statuses included in the status list other than the status determined by the status determiner 110 as the maximum operation frequency.

According to various embodiments of the present disclosure, the scheduler 120 may select one of the sensors 140 whose operation schedule is to be changed based on the status determined by the status determiner 110 and change an operation frequency of the selected sensor 140. For example, when the status determined by the status determiner 110 is a running status, the scheduler 120 may select an accelerator and increase an operation frequency of the accelerator. The scheduler 120 may disable the sensors 140 other than the selected sensor 140 or decrease an operation frequency of each of the sensors 140 other than the selected sensor 140.

According to various embodiments of the present disclosure, the scheduler 120 may change the operation schedule of each of the sensors 140 according to an operation mode of the terminal 100 set by the controller 130. For example, when the operation mode of the terminal 100 is set as a saving mode, the scheduler 10 may determine to enable an operation frequency of one of the sensors 140 when a value obtained by using the one of the sensors 140 is equal to or greater than a predetermined value. In this regard, the controller 130 may set the operation mode of the terminal 100.

According to various embodiments of the present disclosure, when the status determiner 110 determines a plurality of statuses, the scheduler 120 may determine the operation schedule of each of the sensors 140 according to the plurality of statuses. The scheduler 120 may analyze the determined operation schedules and remove a redundant operation of the sensors 140 from the operation schedules. The scheduler 120 may determine the operation schedules satisfying the operations of the sensors 140 required according to the plurality of statuses by combining the operation schedules from which the redundant operation is removed.

The sensors 140 may obtain information relating to the terminal 100 under the control of the controller 130. The sensors 140 may be configured as sensors for determining a location of the terminal 100 such as a GPS. The sensors 140 may detect an event that occurs through a user interface. The sensors 140 may obtain information that is transmitted or received over a network.

The controller 130 may control the sensors 140 to operate according to the operation schedule determined by the scheduler 120 and may obtain information by using the sensors 140. For example, the controller 130 may obtain an acceleration value by using an accelerator.

Various embodiments of the present disclosure may be realized in a form of a non-transitory recording medium including a program module executed by a computer and a command executed by the same computer. A non-transitory computer readable medium includes an arbitrary available medium and also includes volatile and non-volatile media and removable and non-removable media. Additionally, a non-transitory computer readable medium may include a computer storage medium and a communication medium. The computer storage medium includes volatile and non-volatile media and removable and non-removable media, which are realized through an arbitrary method or technique for storing information on a non-transitory computer readable command, a data structure, a program module, or other data. The communication medium typically includes a non-transitory computer readable command, a data structure, a program module, and/or the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a terminal comprising at least one sensor, the method comprising:
   determining a current status regarding an activity of a user of the terminal, the determining of the current status including identifying the current status from a predetermined list of a plurality of statuses regarding the activity of the user of the terminal, the determining of the current status being based on information obtained by using the at least one sensor;
   determining an operation schedule of the at least one sensor based on the determined current status and the information obtained by using the at least one sensor; and
   controlling the at least one sensor to operate based on the determined operation schedule,
   wherein the determining of the operation schedule of the at least one sensor comprises changing an operation frequency of the at least one sensor based on the determined current status from the at least one sensor and the information obtained by using the at least one sensor, and
   wherein the determining of the operation schedule comprises:
      when a plurality of statuses are determined based on the information obtained by using the at least one sensor, determining a plurality of operation schedules based on the plurality of statuses, and
      removing a redundant operation from operations of the at least one sensor included in the determined plurality of operation schedules.

2. The method of claim 1, wherein the determining of the operation schedule further comprises:
   determining an operation frequency of the at least one sensor based on the determined current status and the information obtained by using the at least one sensor.

3. The method of claim 2, wherein the determining of the operation frequency comprises:
   obtaining a period adjusting factor regarding at least one of an increase, and a decrease in the operation frequency of the at least one sensor, or a maximum operation frequency based on the determined current status; and
   determining the operation frequency of the at least one sensor based on a current operation frequency by which the at least one sensor currently operates, the period adjusting factor, and the maximum operation frequency.

4. The method of claim 3, wherein the determining of the operation frequency comprises:
   determining a smaller value between a value obtained by multiplying a current operation frequency and the period adjusting factor, and the maximum operation frequency as the operation frequency of the at least one sensor.

5. The method of claim 3, wherein the determining of the operation frequency comprises:
   determining whether to increase or decrease the operation frequency of the at least one sensor according to whether a value detected by the at least one value is included in a previously set range; and
   determining the previously set range based on the determined current status.

6. The method of claim 3, wherein the maximum operation frequency is a greater value between a maximum requirement value corresponding to the determined current status and a minimum requirement value corresponding to the statuses included in the predetermined list of the plurality of statuses other than the determined current status.

7. The method of claim 1, wherein the determining of the operation schedule comprises:
   disabling or decreasing an operation frequency of the at least one sensor other than the selected sensor.

8. The method of claim 1, wherein the determining of the current status comprises:
   determining the current status of the at least one of the terminal and the activity of the user with the terminal based on an application executed by the terminal or on information regarding a job performed through the application.

9. The method of claim 1, further comprising:
   setting an operation mode of the terminal,
   wherein the determining of the operation schedule comprises:
      when the operation mode of the terminal is set as a saving mode, selecting one of the at least one sensor obtaining a value equal to or greater than a predetermined value, and
      determining to increase or enable the operation frequency of the selected sensor.

10. A non-transitory computer-readable recording medium having embodied thereon a program for executing the method of claim 1.

11. A terminal comprising:
   at least one sensor;
   a processor configured to:
      determine a current status regarding an activity of a user of the terminal, the processor being configured to determine by identifying the current status from a predetermined list of a plurality of statuses regarding the activity of the user of the terminal, the identifying of the current status being based on information obtained by using the at least one sensor;
      determine an operation schedule of the at least one sensor based on the determined current status and the information obtained by using the at least one sensor; and
      control the at least one sensor to operate based on the determined operation schedule,
   wherein the processor is configured to change an operation frequency of the at least one sensor based on the determined current status from the at least one sensor and the information obtained by using the at least one sensor, and
   wherein when a plurality of statuses are determined based on the information obtained by using the at least one sensor, the processor is further configured to determine a plurality of operation schedules based on the plurality of statuses, and remove a redundant operation from operations of the at least one sensor included in the determined plurality of operation schedules.

12. The terminal of claim 11, wherein the processor is further configured to determine an operation frequency of the at least one sensor based on the determined current status and the information obtained by using the at least one sensor.

13. The terminal of claim 12, wherein the processor is further configured to:

obtain a period adjusting factor regarding at least one of an increase and a decrease in the operation frequency of the at least one sensor or a maximum operation frequency based on the determined current status, and determine the operation frequency of the at least one sensor based on a current operation frequency by which the at least one sensor currently operates, the period adjusting factor, and the maximum operation frequency.

14. The terminal of claim 13, wherein the processor is further configured to determine a smaller value between a value obtained by multiplying a current operation frequency and the period adjusting factor, and the maximum operation frequency as the operation frequency of the at least one sensor.

15. The terminal of claim 13, wherein the processor determines whether to increase or decrease the operation frequency of the at least one sensor according to whether a value detected by the at least one value is included in a previously set range, and determines the previously set range based on the determined current status.

16. The terminal of claim 13, wherein the maximum operation frequency is a greater value between a maximum requirement value corresponding to the determined current status and a minimum requirement value corresponding to the statuses included in the predetermined list of the plurality of statuses other than the determined current status.

17. The terminal of claim 11, wherein the processor is further configured to disable or decrease an operation frequency of the at least one sensor other than the selected sensor.

18. The terminal of claim 11, wherein the processor is further configured to determine the current status of the at least one of the terminal or the activity of the user with the terminal based on an application executed by the terminal or information regarding a job performed through the application.

19. The terminal of claim 11, wherein the processor is further configured to set an operation mode of the terminal, and wherein, when the operation mode of the terminal is set as a saving mode, the processor is further configured to select one of the at least one sensor obtaining a value equal to or greater than a predetermined value, and determines to increase or enable the operation frequency of the selected sensor.

20. The method of claim 1, wherein the determining of the operation schedule of the at least one sensor comprises decreasing the operation frequency of the at least one sensor based on the determined current status from the at least one sensor and the information obtained by using the at least one sensor.

* * * * *